United States Patent
Moss et al.

Patent Number: 5,473,948
Date of Patent: Dec. 12, 1995

[54] FLOW MEASUREMENT

[75] Inventors: Brian C. Moss; Fiona A. Ravenscroft, both of Oxford, United Kingdom

[73] Assignee: United Kingdom Atomic Energy Authority, Didcot, United Kingdom

[21] Appl. No.: 316,481

[22] Filed: Oct. 3, 1994

[30] Foreign Application Priority Data

Oct. 15, 1993 [GB] United Kingdom .................. 9321379

[51] Int. Cl.$^6$ ..................................................... G01F 1/00
[52] U.S. Cl. .................................. 73/861.25; 73/861.26; 128/661.08
[58] Field of Search ........................ 73/861.25, 861.26, 73/861.27, 861.28

[56] References Cited

U.S. PATENT DOCUMENTS

| | | |
|---|---|---|
| 4,803,990 | 2/1989 | Bonnefous . |
| 4,853,904 | 8/1989 | Pesque . |
| 5,020,374 | 6/1991 | Petroff et al. ........................ 73/861.25 |
| 5,062,430 | 11/1991 | Bonnefous . |
| 5,311,781 | 5/1994 | Gates ................................ 73/861.25 |
| 5,320,105 | 6/1994 | Bonnefous . |

*Primary Examiner*—Richard Chilcot
*Assistant Examiner*—R. Biegel
*Attorney, Agent, or Firm*—William R. Hinds

[57] ABSTRACT

The movement of particles carried along with a fluid is detected by isonifying a region of the fluid with pulses of ultrasound, and detecting pulses of ultrasound scattered by an individual particle from successive transmitted pulses. The difference in arrival times of successive detected pulses is simply related to the speed of the particle. Use of suitable gates (A, B) enables successive reflections from a particle to be tracked while reflections from other particles are rejected.

9 Claims, 2 Drawing Sheets

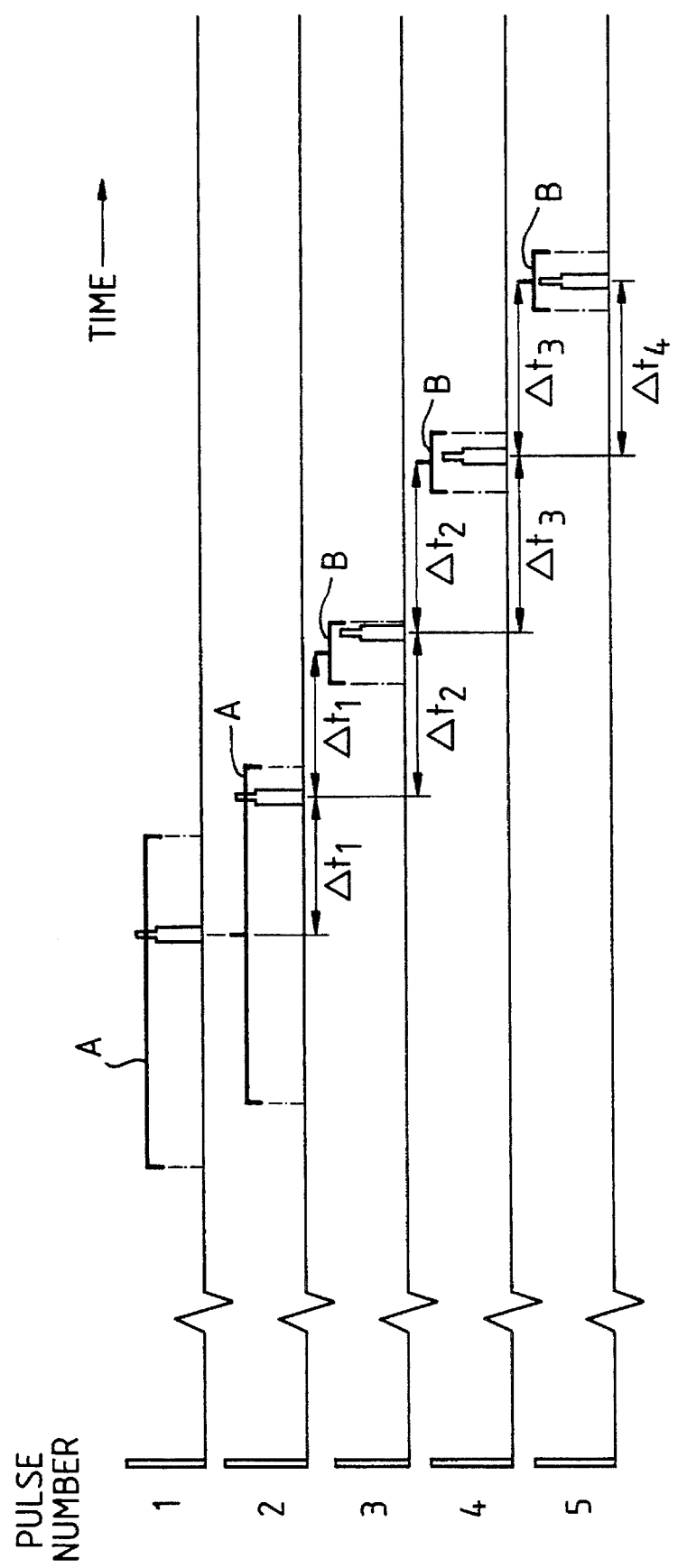

FLOW MEASUREMENT

This invention relates to an ultrasonic method and apparatus for measurement of fluid flow, and to a method and an apparatus for measuring the velocity of particles in a fluid.

A variety of ultrasonic flow measurement techniques are known. Two techniques are known which utilize reflections of ultrasound from scattering particles in a fluid, these being the Doppler effect technique, and the time domain cross-correlation technique. However these techniques require complex electronics to digitise signals, and to measure frequencies or to perform correlation, respectively, so that a simpler technique would be advantageous.

According to the present invention there is provided a method for measuring the velocity of particles in a fluid, the method comprising subjecting the fluid to a pulsed beam of ultrasound, detecting pulses of ultrasound scattered by a particle from successive transmitted pulses, measuring the arrival times of successive detected pulses and hence determining the velocity of the article, wherein the pulses are detected by detection means which include a plurality of gate means to define time intervals after transmission of pulses within which scattered pulses may be detected, including a first gate means arranged to define a first time interval after transmission of a first pulse, the time interval having a duration in the range 4 to 20 µs.

It is desirable to detect pulses scattered by a particle from at least three, preferably at least four, successive transmitted pulses. The differences in arrival time between successive detected pulses should all be the same for sound scattered by a single particle moving at constant velocity, and hence this minimises the possibility of misattributing to the said particle a pulse scattered by a different particle. The nature of the particle is not of significance as long as it scatters sufficient ultrasound to be detected, and it may be a solid particle, a liquid droplet, or a gas bubble, distinct from the surrounding fluid but small enough to be carried along with the flow. For small particles it can be assumed that the particle velocity is indicative of the fluid flow velocity. Tap water circulated in an experimental rig has been found to contain sufficient scattering particles, which in this case are small bubbles.

The invention also provides an apparatus for measuring the velocity of particles in a fluid, the apparatus comprising means to subject the fluid to a pulsed beam of ultrasound, means to detect pulses of ultrasound scattered by a particle from successive transmitted pulses, and means to determine the arrival times of successive detected pulses and hence to determine the velocity of the particle.

By the term arrival time is meant the time interval between the transmission of a pulse and the detection of a scattered pulse. As a particle moves further from the transmitter means, the arrival time will become longer, or if it moves closer to the transmitter means the arrival time will become shorter. The differences in arrival time of successive detected pulses from a particle are simply related to the velocity of that particle.

The detection means includes a plurality of gate means to define time intervals after transmission of pulses within which scattered pulses may be detected including a first gate means arranged to define a first time interval after transmission of a first pulse. In a first preferred embodiment the first time interval has a duration in the range 4 to 20 µs. Clearly there can in general be no certainty that any particle is present and will scatter a pulse to be detected, so transmission of a pulse may have to be repeated until a scattered pulse is detected. Once a pulse is detected in the first time interval, subsequent pulses scattered by the same particle are looked for at appropriate time intervals after transmission of successive pulses.

The said first embodiment preferably also incorporates a second gate means which, if a pulse is detected during the first time interval, is arranged to define a second time interval (after transmission of a second pulse) centred on the arrival time of the pulse detected in the first time interval. If a pulse is detected in the second time interval, then the difference in the arrival times of the two pulses is determined. The apparatus also incorporates a third gate means which is arranged to define a third time interval (after transmission of a third pulse) centred at a time as long after the arrival time of the second pulse as that of the second pulse is after the arrival time of the first pulse. If a pulse is detected in the third time interval, then the difference in the arrival times of the second and third pulses is determined. There may also be other gates similarly arranged to detect subsequent pulses at times when such pulses can be expected to be received.

The start of, and the duration of, the first time interval determine the region of the fluid from which scattered signals will be received, and hence the region at which the velocity will be measured. The duration of the second time interval imposes an upper limit on the velocities of particles whose velocity can be measured. The duration of the third and any subsequent time intervals may be considerably shorter, as these time intervals serve the role of preventing receipt of signals scattered by other particles in the fluid, which would give spurious values of velocity. The first and the second time intervals might for example be in the range 4 to 20 µs, while the third and subsequent time intervals might be in the range 0.1 to 5 µs. The time intervals after the third might be made progressively shorter, as the expected arrival time is known with greater accuracy. In one embodiment the first and the second time intervals are both equal to 10 µs, and the third and all subsequent time intervals are equal to 2 µs.

Desirably a single ultrasonic transducer is used both to transmit and to receive the ultrasonic pulses. If a series of successive pulses are detected from a particle then the speed of the particle towards or away from the transducer can be determined. However any movement of the particle transverse to the direction of the ultrasonic beam does not affect the arrival times; and any beam spread or divergence can therefore lead to inaccuracies in the calculated speed. It is therefore desirable to minimize the beam spread. A preferred transducer for use in water is a 4 MHz unfocussed transducer of diameter 15 mm. The wavelength in water is 0.36 mm (for a speed of 1.43 mm/µs), and the beam spread is 1.7° from the axis. As the maximum inaccuracy is proportional to cos (the angle of divergence), the divergence is desirably less than 5°, more preferably less than 2° either side of the axis of the beam. The operating frequency is desirably in the range 1 MHz to 16 MHz, and such as to provide a wavelength less than four times the size of the expected particles.

Thus a second embodiment of the invention has the features specified earlier, and furthermore a single ultrasonic transducer is used both to transmit the pulsed beam of ultrasound, and to receive the scattered ultrasonic pulses, the transducer operating at a frequency in the range 1 MHz to 16 MHz, and being of such a diameter that the beam diverges less than 5° to either side of the longitudinal axis of the beam.

The invention will now be further described by way of example only and with reference to the accompanying drawings in which:

FIG. 2 shows graphically, plotted against time, a sequence of detected signals and the operation of the signal gates of the apparatus of FIG. 1.

Figure 1:
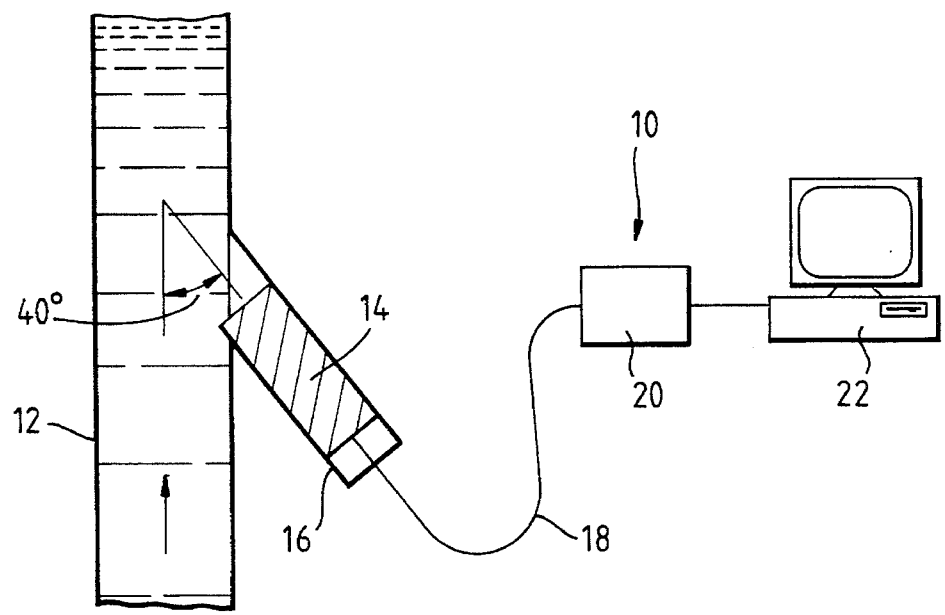
FIG. 1 shows a diagrammatic partly sectional view of an apparatus of the invention.

Referring to FIG. 1 there is shown an apparatus 10 for measuring the rate of flow of water flowing in the direction indicated by the arrow along a tube 12 of bore 50 mm. The apparatus 10 comprises a 4 MHz, 15 mm diameter, unfocussed ultrasonic transducer 14 mounted in a branch tube 16 so the axis of the transducer 14 is inclined at 40° to the direction of flow. An electric cable 18 connects the transducer 14 to a signal processing unit 20 which is connected to a computer 22. In operation the transducer 14 is caused to transmit brief pulses of ultrasound, for example at 4 ms intervals, and between these transmissions any returning ultrasonic pulses can be detected.

If a particle which reflects ultrasound is moving with the water at a velocity v, its direction of motion being at an angle of $\theta$ to the axis of the ultrasonic beam ($\theta=40°$ in this example), in the interval T between one transmitted pulse and the next the particle will have moved further from the transducer. The arrival times of the corresponding reflected pulses are $t_1$ and $t_2$ (these times being times measured from the corresponding transmitted pulses). If the speed of ultrasound is c, and the distance moved by the particle between reflecting one pulse and reflecting the next is L, then:

$$L = c \left( \frac{t_2 - t_1}{2} \right)$$

and $$L = v \cos\theta \left( T + \frac{(t_2 - t_1)}{2} \right)$$

so that:

$$v \cos\theta = \frac{c}{1 + \frac{2T}{(t_2 - t_1)}}$$

It is usually the case that v is much less than c, so that $(t_2-t_1)$ is much less than T. In this case this equation can be simplified to:

$$v \cos\theta = c \frac{(t_2 - t_1)}{2T}$$

It will thus be appreciated that measurement of the arrival times of successive pulses reflected by a single particle enable its speed to be determined, and that the velocity of the medium, along a line parallel to the transducer axis, is directly proportional to the ratio of the time difference between the received signals to the pulse repetition time. If the flow velocity value is low, the arrival times of the pulses become more similar making measurement of $t_2-t_1$ difficult. But if the pulse repetition time T is then increased, the difference in the arrival times of the reflected pulses is increased and the sensitivity of the technique at low velocities can be maintained. The direction of the velocity along the beam axis is indicated by the arithmetical sign of the time difference. The absolute direction and velocity of the flow of the fluid can hence be deduced if two interrogating beams are directed at different angles. Furthermore the position of the scatterer can be determined from its arrival time, so that the velocity profile can be measured along the beam axis.

The processing unit 20 incorporates an interface unit which triggers an ultrasonic signal generator, so as to control the duration and frequency of the transmitted ultrasonic pulses. The unit 20 also includes a received signal amplifier, and a signal discriminator so that only those received signals above a preset level are responded to, which enables reflected signals to be distinguished from noise. It also incorporates a signal timer based on a 50 MHz clock, so providing a resolution for time measurements of 20 ns. Other timings are generated by binary division from this basic clock frequency. Detected pulses are only responded to if an appropriate gate is open. The position and width of the gates are set with a resolution of 80 ns, and the repetition frequency is set with a resolution of 440 ns.

Operation of the apparatus 10 is controlled by the computer 22 which enables the signal gain and the threshold level to be set, controls the tracking procedure as described below, calculates the velocity, and displays the results. The computer program first requires the following input parameters (typical values are also given):

1. Pulse Repetition Time: 4 ms
2. 1st Gate width: 10 μs
3. 2nd Gate width: 2 μs
4. Gate Start: 70 μs
5. Number of Measurements: 100
6. Gain: 155

The first gate is the search gate and is wide enough to pick up the signals from a moving scatterer on two successive pulses. The second gate is a narrow tracking gate and is moved to surround the predicted position where the next signal should arrive. If this is successful the narrow gate is positioned at the next predicted arrival time and so on. With sufficient successes in a row, it can be deduced that the signal sequence is most likely to be from a single scattering particle moving with the fluid and a velocity measurement is made.

Referring to FIG. 2 this shows graphically the receipt of scattered pulses from a particle, as a result of the transmission of five successive ultrasonic pulses. The periods when the gates are open are also indicated. In each case timing commences when the pulse is transmitted. For the first pulse the first gate A is set to open at a time 70 μs after transmission, which corresponds to reflections received from near the middle of the pipe 12. As indicated, a scattered pulse is detected during the time interval while the gate A is open, and its arrival time is noted. For the second pulse the first gate A is set so as to be centred about the arrival time of the first received pulse. If, as indicated in the Figure, a scattered pulse is detected in the interval set by the gate A, then its arrival time is noted and the first time difference $\Delta t_1$ is determined.

For the third pulse, the second gate B is centred at the expected time of arrival, that is at a time $\Delta t_1$ after the arrival time of the second received pulse. If, as indicated, a pulse is detected then its arrival time is noted, and the second time difference $\Delta t_2$ is determined. For the fourth pulse the second gate B is centred at the expected time of arrival, that is at a time $\Delta t_2$ after the arrival time of the third received pulse. If, as indicated, a pulse is detected, then its arrival time is noted and the third time difference $\Delta t_3$ is determined. For the fifth pulse gate B is used in the same fashion, to enable a fourth time difference $\Delta t_4$ to be determined. This procedure could be continued until no pulse is received, or more usually the procedure is terminated when an adequate number of time differences (for example four) have been obtained.

The best estimate of the time difference $(t_2-t_1)$ is obtained from the average of the values $\Delta t_1$, $\Delta t_2$, $\Delta t_3$, $\Delta t_4$ as found above for a particular particle. This enables one measurement of velocity to be made using the equation discussed earlier. In addition the standard deviation of these values of time difference gives an indication of the accuracy of the measurement. The process is then repeated to find and track other particles, and to determine their velocities, until the desired number of measurements has been obtained. The resulting measurements of velocity can be used to generate a velocity distribution, the standard deviation of the velocity measurements in each band of the velocity distribution also being determined.

The start position and the width of the search gate A determine the region within the tube 12 where velocity measurements will take place. This region may contain a spread of velocities. The results of the velocity measurements and their distribution will indicate this, and the maximum in the distribution should occur at the predominant velocity in the region. The velocity profile across the tube 12 can be studied by using a narrower search gate A, for example 5 μs, and adjusting the start time of the first (search) gate A so as to measure velocities at difference positions across the tube 12.

The apparatus 10 may be arranged to detect either the first signal that is received (above a noise threshold), or the largest signal received, while a gate is open. If a signal pulse scattered by a different particle is received this may give an inaccurate velocity measurement. However this is likely to give inconsistent time differences, so subsequent reflected pulses would be rejected by the narrow tracking gate B. Inconsistent time differences arising from other causes (for example from use of too low a noise threshold) may be rejected on the basis that the standard deviation of the time difference measurements is too large.

It will be appreciated that the apparatus 10 may be modified in various ways. For example the gate used for the first pulse might be a different gate to that used for the second pulse, and might be of a different duration. The duration of the gate used for the first pulse determines the spatial resolution across a velocity profile, while the duration of the gate used for the second pulse determines the maximum velocity the apparatus can measure. The apparatus 10 has been operated successfully with the gate A having durations over the range 4 μs up to 15 μs. The duration of the tracking gate B determines the likelihood of spurious pulses being responded to, and so affects the reliability of the measurements. The apparatus 10 has been operated successfully with the gate B having durations in the range 0.1 to 5 μs.

The pulse repetition frequency may also be varied. If it is too slow the scatterer being tracked will move out of the ultrasonic beam before the next pulse arrives, but if it is too fast the difference between the arrival times of successive reflections off the same scatterer will become very small and owing to the limit in the time resolution of the measurements, the accuracy of the result will decrease. However a fast pulse repetition frequency provides the advantage that measurements are made more quickly. With the apparatus 10 values of pulse repetition time between 1 ms and 8 ms have been used successfully.

In the apparatus 10 much of the signal processing and control of the operation is performed using software, by the computer 22. It will be understood that alternatively this may be achieved using purpose-built, dedicated hardware. This can provide a more rapid measurement capability.

Figure 3:
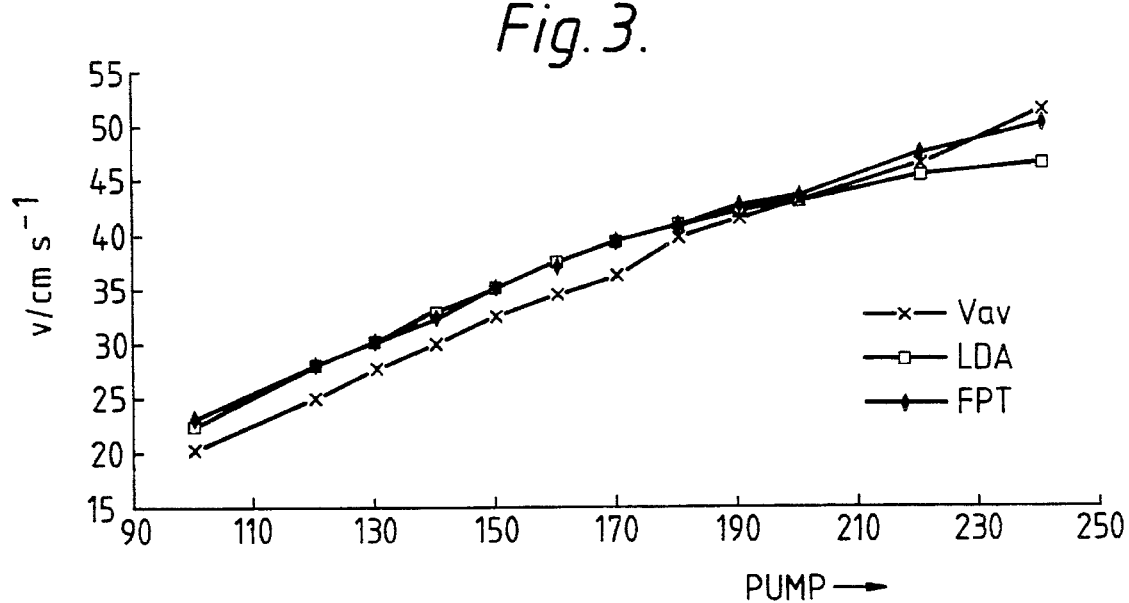
FIG. 3 shows graphically experimentally determined measurements of flow rate using the apparatus of FIG. 1, and comparison measurements made using two other techniques.

Referring now to FIG. 3 there are shown measurements of water flow velocity v in the tube 12, as the power supply to the pump causing the flow was varied. Three different measurements are shown. These were obtained:

(a) by measuring the rate at which a calibrated beaker was filled; this gives an average velocity across the tube, and is indicated as Vav;

(b) by measuring the flow velocity at the centre of the tube 12 by laser Doppler anemometry; this is indicated as LDA; and (c) using the apparatus 10 as described above; this is indicated as FPT.

(The figures for the pump supply relate only to the dial of an adjustable transformer.) The flow rates were such that at all power settings the flow was turbulent, so the velocity profile would be expected to be flatter across the middle of the tube 12 than with laminar flow.

As expected the average velocity values fall below the velocity measurements for both LDA and FPT measurements except at higher velocities where the LDA measurements fall below the average values. The LDA was set up for a particular velocity range and accuracy may have fallen off at these higher velocities. The FPT measurements fall very close to the LDA values and follow the average velocity values with pump speed; on average the FPT values lie within 1.7% of the LDA results.

It will be appreciated that use of the present method requires a knowledge of the speed of sound in the fluid. In obtaining the results discussed above the speed of sound was measured in the water in the pipe 12. The technique is applicable in other liquids and even in two-phase mixtures such as an oil/water mixture. However in this case the velocity of sound in oil is typically about $1350$ m s$^{-1}$, which is about 10% less than in water so it is preferable to measure the sound velocity in situ rather than relying on an assumed value.

We claim

1. A method for measuring the velocity of particles in a fluid, the method comprising subjecting the fluid to a pulsed beam of ultrasound, detecting pulses of ultrasound scattered by a particle from successive transmitted pulses, measuring the arrival times of successive detected pulses and hence determining the velocity of the particle, wherein the pulses are detected by detection means which include a plurality of gate means to define time intervals after transmission of pulses within which scattered pulses may be detected, including a first gate means arranged to define a first time interval after transmission of a first pulse, the first time interval having a duration in the range 4 to 20 μs.

2. A method as claimed in claim 1 wherein the arrival times of at least three successive detected pulses scattered by a particle are measured.

3. An apparatus for measuring the velocity of particles in a fluid, the apparatus comprising means for subjecting the fluid to a pulsed beam of ultrasound, means to detect pulses of ultrasound scattered by a particle from successive transmitted pulses, and means to determine the arrival times of successive detected pulses and hence to determine the velocity of the particle, wherein the detection means includes a plurality of gate means to define time intervals after transmission of pulses within which scattered pulses may be detected, including a first gate means arranged to define a first time interval after transmission of a first pulse, the first time interval having a duration in the range 4 to 20 μs.

4. An apparatus as claimed in claim 3 wherein the detection means also includes a second gate means which, if a pulse is detected during the first time interval, is arranged to define a second time interval after transmission of a second pulse centred on the arrival time of the pulse detected in the first time interval.

5. An apparatus as claimed in claim 4 wherein the detection means also includes a third gate means which, if a pulse is detected in the second time interval, is arranged to define a third time interval after transmission of third pulse centred at a time as long after the arrival time of the second pulse as that of the second pulse is after the arrival time of the first pulse.

6. An apparatus as claimed in claim 5 wherein the third time interval is less than the second time interval.

7. An apparatus as claimed in claim 4 wherein the first and the second time intervals each have a value in the range 4 to 20 µs.

8. An apparatus as claimed in claim 5 wherein the third time interval has a value in the range 0.1 to 5 µs.

9. An apparatus for measuring the velocity of particles in a fluid, the apparatus comprising means for subjecting the fluid to a pulsed beam of ultrasound, means to detect pulses of ultrasound scattered by a particle from successive transmitted pulses, and means to determine the arrival times of successive detected pulses and hence to determine the velocity of the particle, wherein the detection means includes a plurality of gate means to define time intervals after transmission of pulses within which scattered pulses may be detected, including a first gate means arranged to define a first time interval after transmission of a first pulse, and wherein a single ultrasonic transducer is used both to transmit the pulsed beam of ultrasound, and to receive the scattered ultrasonic pulses, the transducer operating at a frequency in the range 1 MHz to 16 MHz, and being of such a diameter that the beam diverges less than 5° to either side of the longitudinal axis of the beam.

\* \* \* \* \*